(12) United States Patent
Hiromori et al.

(10) Patent No.: US 7,075,477 B2
(45) Date of Patent: Jul. 11, 2006

(54) RADAR

(75) Inventors: Masaki Hiromori, Kanagawa (JP); Etsuo Kakishita, Hyogo (JP)

(73) Assignees: Fujitsu Ten Limited, Kobe (JP); Fujitsu Limited, Kawasaki (JP)

(*) Notice: Subject to any disclaimer, the term of this patent is extended or adjusted under 35 U.S.C. 154(b) by 95 days.

(21) Appl. No.: 10/857,006

(22) Filed: Jun. 1, 2004

(65) Prior Publication Data
US 2005/0001758 A1 Jan. 6, 2005

(30) Foreign Application Priority Data
Jun. 4, 2003 (JP) .............................. 2003-159938

(51) Int. Cl.
*G01S 7/282* (2006.01)
*G01S 13/08* (2006.01)

(52) U.S. Cl. .......................... 342/82; 342/118; 342/88; 342/70

(58) Field of Classification Search ................... 342/89, 342/118, 82, 88
See application file for complete search history.

(56) References Cited

U.S. PATENT DOCUMENTS

| | | | | |
|---|---|---|---|---|
| 4,630,226 A | * | 12/1986 | Tanaka ........................ 702/103 |
| 5,677,695 A | * | 10/1997 | Suzuki et al. ................ 342/109 |
| 6,121,919 A | * | 9/2000 | Ameen et al. ............... 342/174 |
| 6,204,803 B1 | * | 3/2001 | Uehara ......................... 342/70 |
| 6,229,474 B1 | * | 5/2001 | Uehara ......................... 342/70 |
| 6,278,398 B1 | * | 8/2001 | Vossiek et al. ............. 342/128 |
| 6,384,768 B1 | * | 5/2002 | Kai ............................... 342/70 |
| 2003/0001772 A1 | * | 1/2003 | Woodington et al. ......... 342/70 |
| 2003/0016163 A1 | * | 1/2003 | Isaji ............................. 342/70 |

FOREIGN PATENT DOCUMENTS

| JP | A 07-159524 | 6/1995 |
| JP | A 10-082856 | 3/1998 |
| JP | A 2002-131417 | 5/2002 |

* cited by examiner

*Primary Examiner*—Thomas H. Tarcza
*Assistant Examiner*—Matthew Barker
(74) *Attorney, Agent, or Firm*—Oliff & Berridge, PLC

(57) ABSTRACT

A radar includes a transmission signal processing system, a reception signal processing system, an auxiliary signal processing system, a transmission-signal input unit, and a search determination unit. The transmission signal processing system transmits a transmission signal. The reception signal processing system receives and processes a reflected wave at a target. The auxiliary signal processing system is separate from the reception signal processing system and has the same configuration as at least a part of the reception signal processing system having a low operation speed. The transmission-signal input unit inputs a signal generated in the transmission signal processing system to the auxiliary signal processing system directly. The search determination unit makes a determination on the search for the target on the basis of processing results of the received reflected wave by the reception signal processing system and the directly input signal by the auxiliary signal processing system.

7 Claims, 6 Drawing Sheets

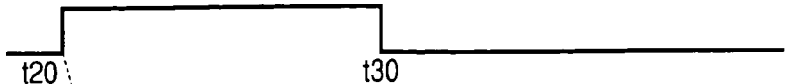
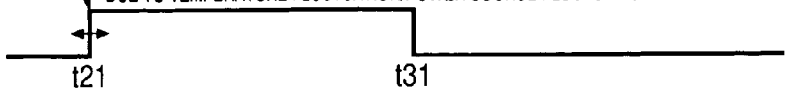
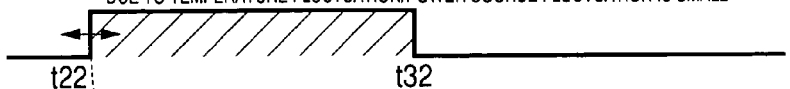
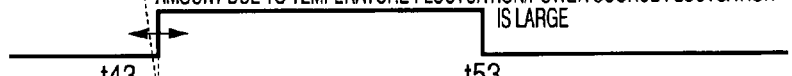
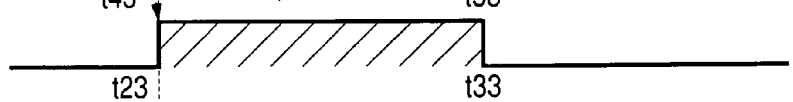
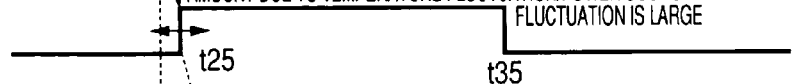
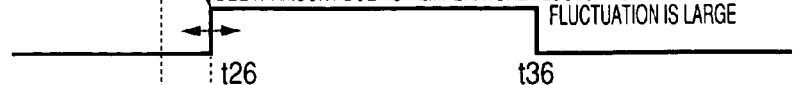
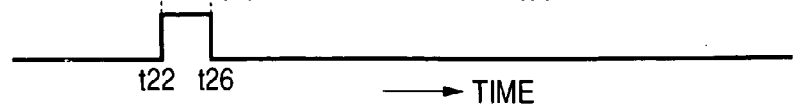

→ TIME

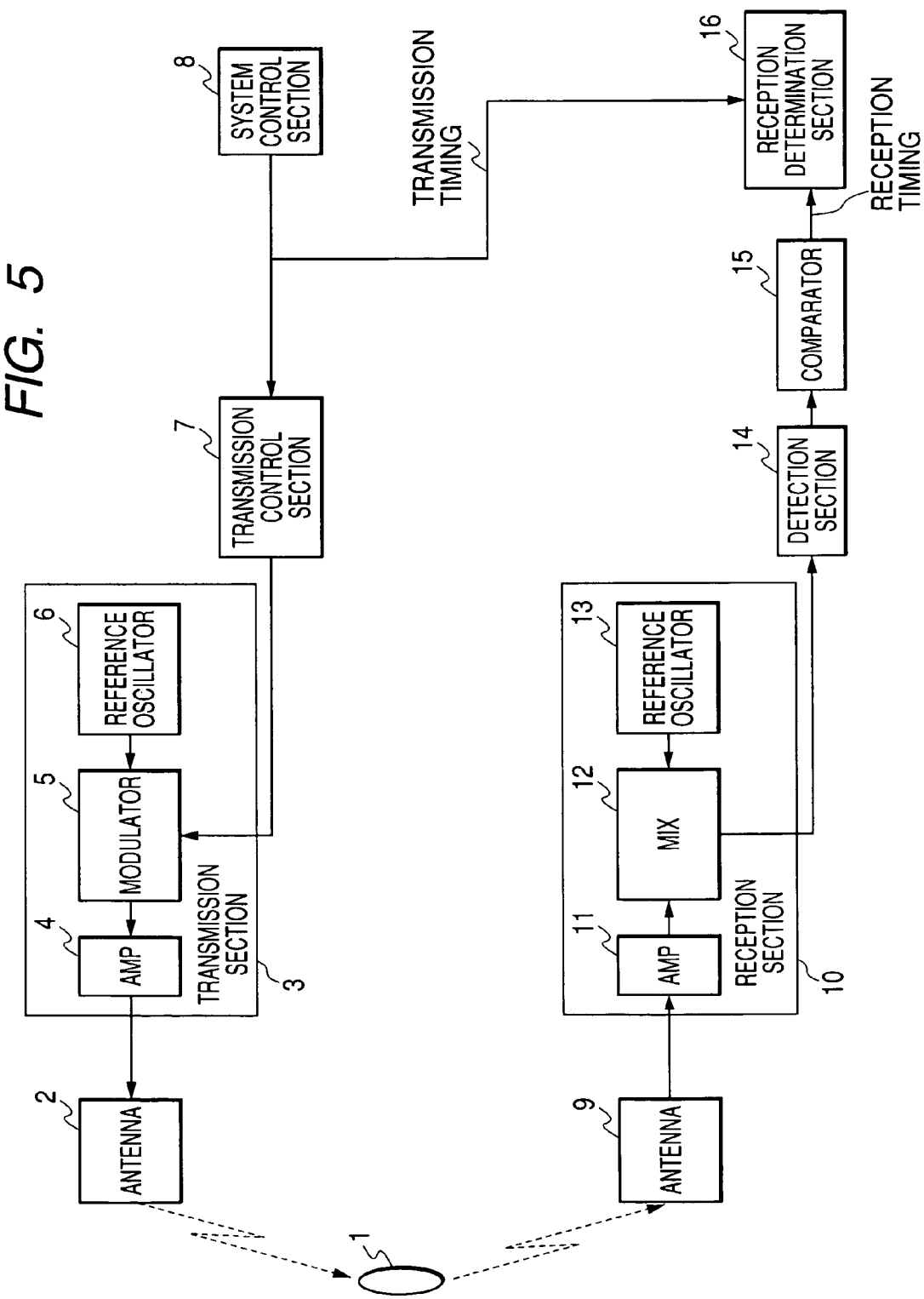

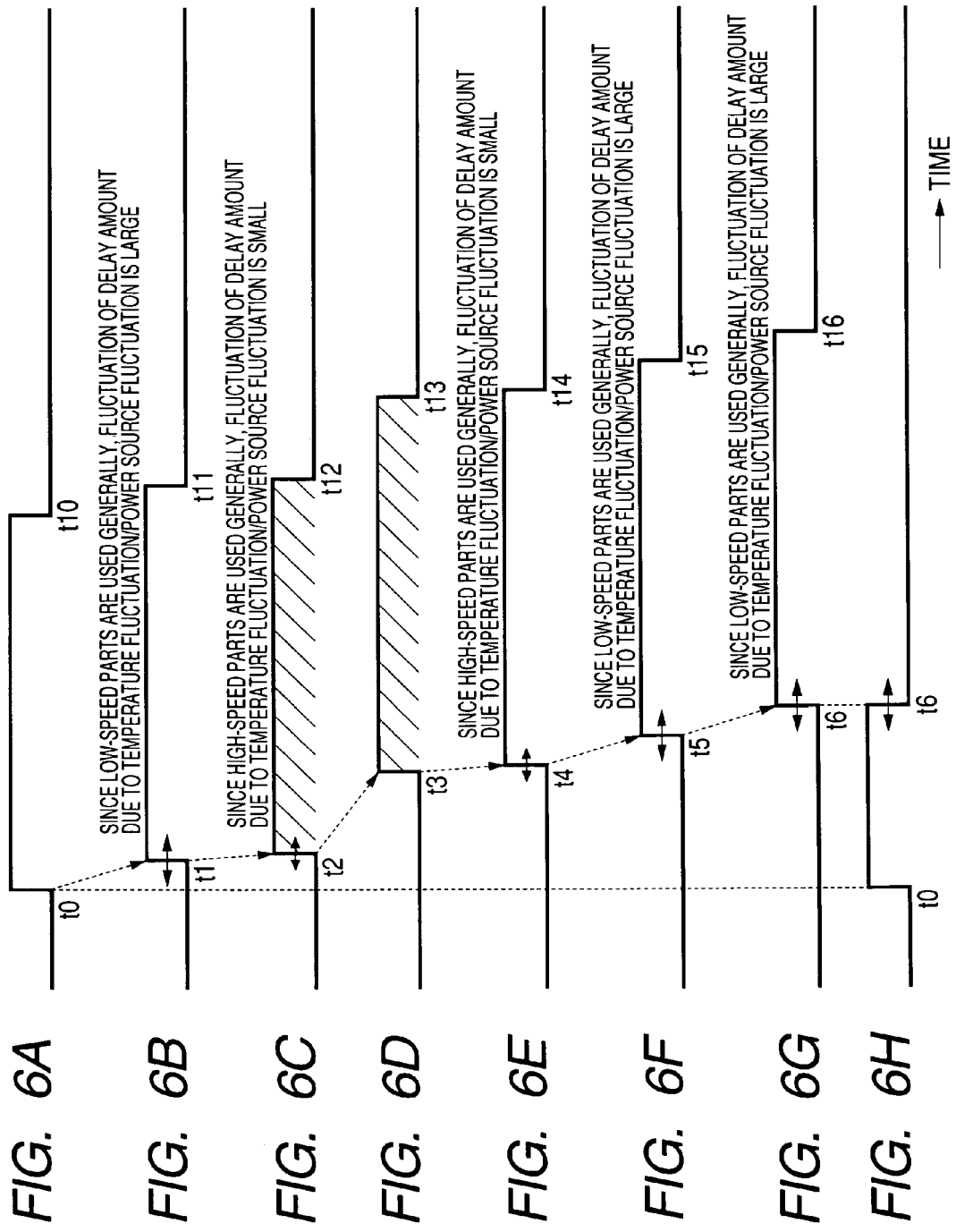

RADAR

BACKGROUND OF THE INVENTION

1. Field of the Invention

This invention relates to a radar for transmitting laser light, an ultrasonic wave, etc., to space as a search wave and receiving reflected wave to search for a target.

2. Description of the Related Art

JP-A-Hei. 7-159524 and JP-A-Hei. 10-82856 disclose that a reception signal processing system processes a signal of directly receiving a transmission wave and a signal of receiving a reflected wave at a target simultaneously to determine a difference between a transmission timing and a reception timing. Also, JP-A-2002-131417 proposes using an ultra sonic wave. A disclosed configuration includes an ultra sonic sensor having ultra sonic transmission means and ultra sonic reception means for receiving a reflected wave of the ultra sonic wave, and an ultra sonic reception device, which is disposed at a given distance from the ultra sonic sensor. The disclosed configuration corrects sound speed change due to change of the surrounding temperature.

SUMMARY OF THE INVENTION

A radar having a configuration as shown in FIG. 5 is attached to the body of an automobile, for example, for use for forward search in the running direction. In order to search for a target 1, the radar includes an antenna 2 and a transmission section 3. The antenna 2 transmits a radio wave in a high frequency band called millimeter wave, for example, to space as a search wave. The transmission section 3 supplies high-frequency power to the antenna 2 for drive so as to transmit a search wave from the antenna 2. The transmission section 3 includes an AMP 4 for performing high-frequency power amplification, a modulator 5 for modulating and giving a high frequency signal to the AMP 4 so that a radar search can be made, and a reference oscillator 6 for giving the high frequency signal to the modulator 5 as modulated signal. For example, to operate the radar in a pulse radar mode, the modulator 5 modulates the high frequency signal from the reference oscillator 6 in a pulse shape and input the pulse signal to the AMP 4. A transmission control section 7 generates a transmission modulation signal given to the modulator 5. A system control section 8 generates the transmission timing is generated.

That is, in the transmission operation, the system control section 8 generates the transmission timing and sends the transmission timing to the transmission control section 7. The transmission control section 7 generates the transmission modulation signal and the modulator 5 modulates a reference oscillator frequency from the reference oscillator 6 and the AMP 4 amplifies the signal from the modulator 5. The amplified signal is transmitted to space through the antenna 2.

When the target 1 exists, an antenna 9 receives a wave reflected at the target 1. A reception section 10 processes the reception signal. The reception section 10 includes an AMP 11 for high-frequency signal amplification, a mixer (MIX) 12 for mixing the high frequency signal with a reference oscillation signal, and a reference oscillator 13 for generating the reference oscillation signal. The AMP 11 amplifies a feeble high-frequency reception signal with low noise. The MIX 12 mixes the amplified signal with a high frequency signal from the reference oscillator 13 to take out a lower frequency signal as the difference frequency component between the high frequency of the reception signal and the reference oscillator frequency. A detection section 14 detects the taken-out reception signal and converts the reception intensity into a voltage. A comparator 15 determines whether or not the signal is received at a given voltage level or more, and sends the timing at which the signal was received at the given voltage level or more to a reception determination section 16 as the reception timing. The reception determination section 16 calculates the time difference between the reception timing of the reflected wave determined by the comparator 15 and the transmission timing given from the system control section 8, and determines the distance to the target 1 based on the time difference.

FIGS. 6A to 6H show the transmission and reception timings in the radar of FIG. 5. FIG. 6A shows the transmission timing of the system control section 8. For example, the transmission timing is set so that pulse transmission is started at time t0 and is terminated at time t10. FIG. 6B shows the generation timing of a transmission modulation signal generated in the transmission control section 7. Generation of the transmission modulation signal is started at time t1 and is terminated at time t11.

FIG. 6C shows the output timing of the transmission antenna 2. Output is started at time t2 and is stopped at time t12. FIG. 6D shows the input timing to the reception antenna 9. Input is started at time t3 and is terminated at time t13. FIG. 6E shows the output timing from the MIX 12 on the reception side. Output is started at time t4 and is terminated at time t14. FIG. 6F shows the output timing from the detection section 14. Output is started at time t5 and is terminated at time t15. FIG. 6G shows the output timing from the comparator 15. Output is started at time t6 and is terminated at time t16. FIG. 6H shows the difference between the transmission timing and the reception timing. The difference is timing interval between time t0 at which the system control section 8 generates the transmission timing and time t6.

In FIGS. 6C and 6E, high frequency signals are processed and generally high-speed parts, which operate at high speed, are used. Thus, the time delay is small and the temperature power-supply fluctuation amount caused by fluctuation of temperature or power supply is also small. In FIGS. 6B, 6F, and 6G, generally low-speed parts are used. Thus, the time delay is large. In the parts, the delay amounts also fluctuate due to fluctuation of temperature or power supply. Moreover, the fluctuation of the delay amount becomes noticeable in the low-speed parts having the large absolute amount of the delay amount. Consequently, the temperature power-supply fluctuation amount caused by fluctuation of temperature or power supply becomes large at each timing in FIGS. 6B, 6F, and 6G. Essentially, the time taken for a radio wave to go to the target 1 and back therefrom should be calculated as t3-t2 FIGS. 6C and 6D. However, the reception determination section 16 calculates the time of t6-t0 and the time contains the delays of low-speed circuits such as t6-t5 and t1-t0 and easily fluctuates because of the effect of fluctuation of temperature or power supply.

As shown in FIG. 6, the output phases of the parts fluctuate because of temperature or power supply fluctuation, etc., and the reception timing generated from the reflected signal from the target 1 at the same distance fluctuates. Therefore, some correction needs to be made. If no correction is made, it is determined that the distance to the target is long or short. If the relationship between the temperature of the radar and the delay fluctuation amount caused by temperature or power supply fluctuation of each part can be grasped, it is estimated that precise correction can also be made. However, the delay fluctuation characteristic varies from one part to another and to maintain accuracy, the characteristic needs to be grasped for each part and it is very difficult to realize.

If the reception signal processing system directly receives the transmission wave as JP-A-Hei. 7-159524 and JP-A-Hei. 10-82856, the signal must be separated in the same signal processing system. For example, if reception of reflection signal is started at time t3 within the time of t10-t1 of the transmission timing, it becomes difficult to determine the timing of the reception start of the reflection signal, because when the reception level of directly receiving the transmission signal is high, the reflection signal is masked if it is received; when the reception level of directly receiving the transmission signal and that of the reflection signal are equal, it becomes difficult to discriminate therebetween.

A vehicle-installed radar needs to search for a target at a comparatively short distance. The time taken for a search wave to go to the target 1 and back therefrom is comparatively short. Therefore, an error of the determined difference between the transmission timing and the reception timing becomes large because of delay amount fluctuation receiving the effect of temperature or power supply fluctuation of the parts. In JP-A-2002-131417, a correction can be made to the temperature change of the air in which the ultrasonic wave propagates, but not to fluctuation in the signal processing system.

The invention provides a radar capable of easily maintaining accuracy if the delay amounts of the parts used for signal processing fluctuate because of fluctuation of temperature, power supply, etc.

According to an embodiment of the invention, a radar for searching for a target, includes a transmission signal processing system, a reception signal processing system, an auxiliary signal processing system, a transmission-signal input unit, and a search determination unit. The transmission signal processing system generates and transmits a transmission signal to space as a search wave. The reception signal processing system receives a reflected wave at the target when the target exits and processes the received reflected wave. The auxiliary signal processing system is separate from the reception signal processing system and has the same configuration as at least a part of the reception signal processing system, which has an operation speed lower than a predetermined frequency. The transmission-signal input unit inputs a signal generated in the transmission signal processing system to the auxiliary signal processing system directly. The search determination unit makes a determination on the search for the target on the basis of a processing result of the received reflected wave by the reception signal processing system and a processing result of the directly input signal by the auxiliary signal processing system.

The radar transmits the transmission signal generated by the transmission signal processing system to the space as the search wave. In order that when the target exits in the space, the reception signal processing system receives the reflected wave at the target and conduct a searching process for the target, the radar includes the auxiliary signal processing system, the transmission-signal input unit, and the search determination unit. Since the auxiliary signal processing system is separate from the reception signal processing system and has the same configuration as at least the part of the reception signal processing system, which has the operation speed lower than the predetermined frequency, the reception signal processing system and the auxiliary signal processing system cause equivalent delay amount in the signal processing and equivalent fluctuation of the delay amount due to the effect of the temperature fluctuation or the power source fluctuation. Since the transmission-signal input unit inputs the signal generated in the transmission signal processing system to the auxiliary signal processing system directly, the auxiliary signal processing system is required to process only the input signal and the reception signal processing system is required to process only the received reflected wave (reception signal). Therefore, the timing when the transmission signal is transmitted and the timing when the reception signal is received can be determined accurately. The search determination unit makes a determination on the search for the target on the basis of a processing result of the received reflected wave by the reception signal processing system and a processing result of the directly input signal by the auxiliary signal processing system. The part of the reception signal processing system having the operation speed lower than the predetermined frequency tends to fluctuate the delay amount under the influence of the temperature fluctuation or the power source fluctuation. However, the auxiliary signal processing system causes the equivalent delay amount. Therefore, in the determination process on the target search performed by the search determination unit, the large fluctuation of the delay amount caused in the reception signal processing system cancels that in the auxiliary signal processing system each other. As a result, even if the delay amount caused by parts used in the signal processing fluctuate due to the temperature fluctuation or the power source fluctuate, the accuracy can be maintained easily.

According to an embodiment of the invention, the reception signal processing system includes a high-speed operation circuit and a low-speed operation circuit. The high-speed operation circuit is formed of a high-speed operation part operating at a higher frequency than the predetermined frequency and processes the received reflected wave. The low-speed operation circuit is formed of a low-speed operation part operating at a lower frequency than the predetermined frequency. The auxiliary signal processing system includes an auxiliary high-speed operation circuit and an auxiliary low-speed operation circuit. The auxiliary high-speed operation circuit has the same configuration as the high-speed operation circuit. The auxiliary low-speed operation circuit has the same configuration as the low-speed operation circuit. The signal, which the transmission-signal input unit inputs to the auxiliary high-speed operation circuit of the auxiliary signal processing system directly, is the transmission signal generated in the transmission signal processing system.

Therefore, the auxiliary signal processing system can process the input transmission signal in a similar manner to the reception signal processing system. The reception signal processing system and the auxiliary signal processing system cause equivalent delay amount in the signal processing and equivalent fluctuation of the delay amount due to the effect of the temperature fluctuation or the power source fluctuation. As a result, since the fluctuation of the delay amount due to the effect of the temperature fluctuation or the power source fluctuation is not affected on calculation of the difference between the transmission timing and the reception timing greatly, calculation accuracy of a distance to the target can be enhanced.

According to an embodiment of the invention, the reception signal processing system includes a high-speed operation circuit and a low-speed operation circuit. The high-speed operation circuit is formed of a high-speed operation part, which operates at a higher frequency than the predetermined frequency. The low-speed operation circuit is formed of a low-speed operation part, which operates at lower speed than the predetermined frequency. The auxiliary signal processing system includes an auxiliary low-speed operation circuit having the same configuration as the low-speed operation circuit. The signal, which the transmission-signal input unit inputs to the auxiliary low-speed operation circuit of the auxiliary signal processing system directly, is equivalent to a signal to be processed by the low-speed operation circuit of the reception signal processing system.

The auxiliary signal processing system can process the input modulation signal in a similar manner to the low-speed operation circuit of the reception signal processing system. In the reception signal processing system, the low-speed operation circuit, which involves larger delay amount than the high-speed operation circuit, causes larger fluctuation of the delay amount due to the effect of the temperature fluctuation or the power source fluctuation than the high-speed operation circuit. In the above-described configuration, the auxiliary low-speed operation circuit of the auxiliary signal processing system can cancel the fluctuation of the delay amount. Therefore, the fluctuation of the delay amount is not affected on the calculation of the difference between the transmission timing and the reception timing greatly. As a result, the calculation accuracy of the distance to the target can be enhanced. Generally, the high-speed operation parts are more expensive than the low-speed operation parts. The auxiliary signal processing system is not necessary to include a circuit having the same configuration as the high-speed operation circuit of the reception signal processing system. Therefore, the effect of the fluctuation can be reduced at low cost.

According to an embodiment of the invention, the at least part of the reception signal processing system and the corresponding part of the auxiliary signal processing system include circuits, which are identical to each other and are formed on a single semiconductor integrated circuit board.

Therefore, it is easy to provide the same circuit configuration. Furthermore, the effect of the temperature or the like is influenced on the circuits on the single semiconductor integrated circuit board equally, and the fluctuation of the delay amount caused in the circuits on the single semiconductor integrated circuit board can also be made equal. Since the fluctuation of the delay amount caused in one circuit and that caused in the other circuit can cancel each other, search determination can be made with good accuracy.

BRIEF DESCRIPTION OF THE DRAWINGS

FIGS. 2A to 2L are time charts to show the degree of the effect of temperature fluctuation or power supply fluctuation in a case of operating the radar 20 in FIG. 1 in pulse mode.

FIG. 5 is a block diagram to show the schematic electric configuration of a radar.

FIGS. 6A to 6H are time charts to show the degree of the effect of temperature fluctuation or power supply fluctuation in a case of operating the radar in FIG. 5 in pulse mode.

DETAILED DESCRIPTION OF THE PREFERRED EMBODIMENT

Figure 1:
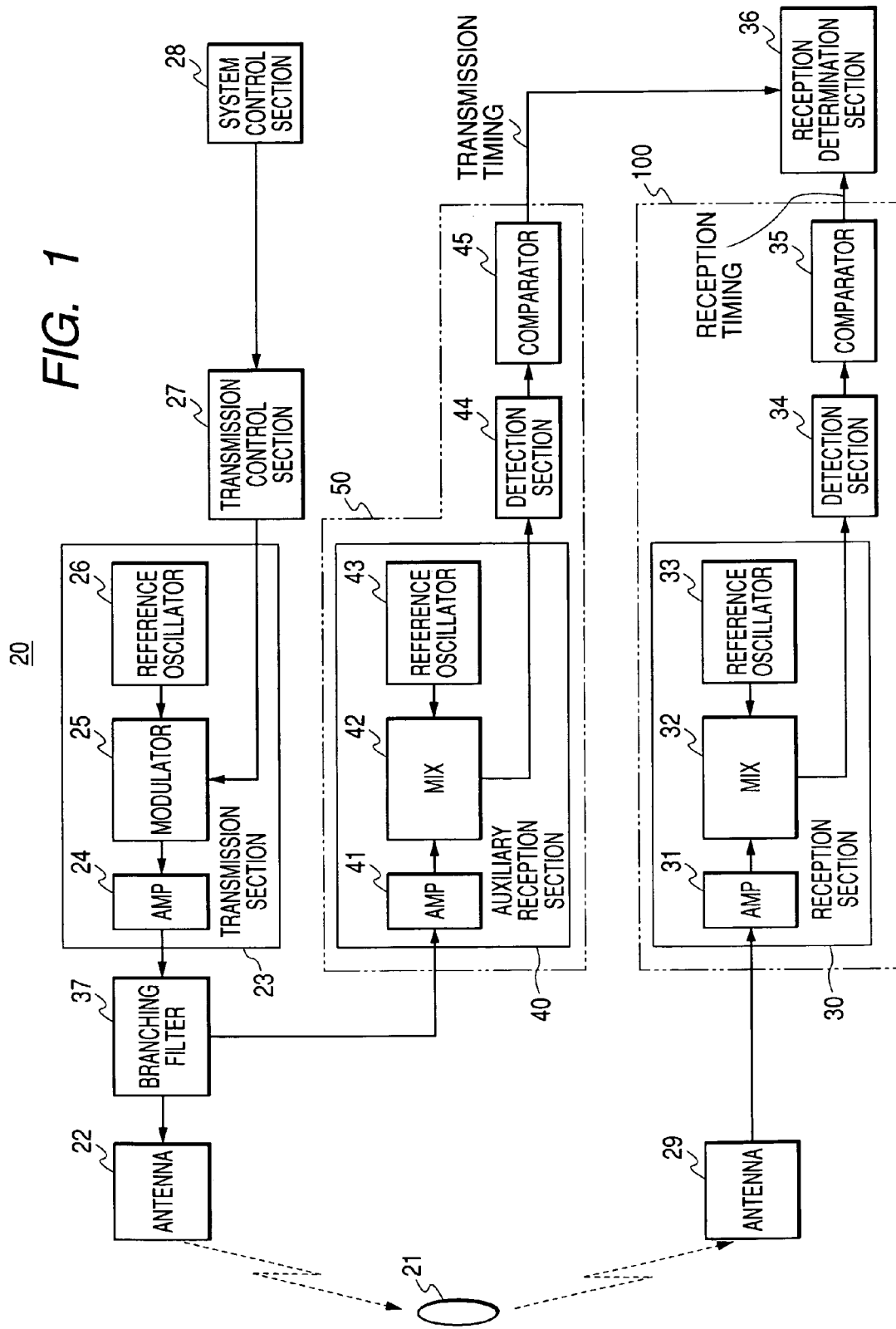
FIG. 1 is a block diagram to show the schematic electric configuration of a radar 20 according to a first embodiment of the invention.

FIG. 1 shows the schematic electric configuration of a radar 20 according to a first embodiment of the invention. The radar 20 of the embodiment searches for a target 21 in a pulse radar mode like the radar shown in FIG. 5. In order to search for the target 21, the radar 20 includes an antenna 22 and a transmission section 23. The antenna 22 transmits a radio wave in a high frequency band called millimeter wave, for example, to space as a search wave. The transmission section 23 supplies high-frequency power to the antenna 22 for drive so as to transmit a search wave from the antenna 22. The transmission section 23 includes an AMP 24, a modulator 25, and a reference oscillator 26. The AMP 24 performs high-frequency power amplification. The modulator 25 modulates and gives a high frequency signal to the AMP 24 so that a radar search can be made. The reference oscillator 26 gives the high frequency signal to the modulator 25 as a signal to be modulated. A transmission control section 27 generates a transmission modulation signal, which is given to the modulator 25. A system control section 28 generates the transmission timing.

When the target 21 exists, an antenna 29 receives a wave reflected at the target 21. A reception section 30 processes the reception signal received at the antenna 29. The reception section 30 includes an AMP 31 for high-frequency signal amplification, a mixer (MIX) 32 for mixing the high frequency signal with a reference oscillation signal, and a reference oscillator 33 for generating the reference oscillation signal. The AMP 31 amplifies a feeble high-frequency reception signal with low noise. The MIX 32 mixes the amplified signal with the high frequency signal from the reference oscillator 33 to take out a lower frequency signal as the difference frequency component between the high frequency of the reception signal and the reference oscillator frequency. A detection section 34 detects the taken-out reception signal and converts the reception intensity into a voltage. A comparator 35 determines whether or not the signal is received at a given voltage level or more, and sends the timing at which the signal was received at the given voltage level or more to a reception determination section 36 as the reception timing. The reception determination section 36 calculates the time difference between the reception timing of the reflected wave determined by the comparator 35 and the transmission timing given from an auxiliary signal processing system 50, and determines the distance to the target 21 on the basis of the time difference. The transmission section 23 and the reception section 30 are formed using high-speed operation parts that can operate at high speed, such as parts for high frequencies. The other sections are formed using low-speed operation parts. Parts, whose operation frequency is higher than a predetermined frequency (e.g. 500 MHz), may be classified into the high-speed operation parts. Also, parts, whose operation frequency is lower than the predetermined frequency, may be classified into the low-speed operation parts. Specifically, the high-speed operation parts operate at several GHz, and the low-speed operation parts operate at several tens MHz.

The radar 20 of the embodiment includes a branching filter 37, which branches the high-frequency signal sent from the transmission section 23 to the antenna 29 to cause an auxiliary reception section 40 to receive the high-frequency signal directly. The auxiliary reception section 40 includes an AMP 41, a MIX 42, and a reference oscillator 43. The AMP 41, the MIX 42, and the reference oscillator 43 have the same configurations as the AMP 31, the MIX 32, and the reference oscillator 33 of the reception section 30, respectively. A detection section 44 for detecting the level of the signal taken out from the MIX 42 of the auxiliary reception section 40 and a comparator 45 for determining the timing as level comparison also have the same configurations as the detection section 34 and the comparator 35 provided in the reception section 30.

FIGS. 2A to 2L show the degree of the effect of temperature fluctuation or power supply fluctuation when the radar 20 in FIG. 1 operates in a pulse mode. FIG. 2A shows the transmission timing of the system control section 28. For example, the transmission timing is set so that pulse transmission is started at time t20 and is terminated at time t30. FIG. 2B shows the generation timing of a transmission modulation signal generated from the transmission control section 27. Generation of the signal is started at time t21 and is terminated at time t31. FIG. 2C shows the output timing of the transmission antenna 22. This timing is also the timing at which the transmission signal is output from the branching filter 37 to the auxiliary reception section 40. This output is started at time t22 and is stopped at time t32.

FIG. 2D shows the input timing to the auxiliary reception section 40. The input of the transmission signal from the branching filter 37 is started at time t40 and is terminated at time t50. FIG. 2E shows the output timing from the MIX 42. The output is started at time t41 and is terminated at time t51. FIG. 2F shows the output timing from the detection section 44. The output is started at time t42 and is terminated at time t52. FIG. 2G shows the output timing from the comparator 45. The output is started at time t43 and is terminated at time t53. The reception determination section 36 determines time t43 to be the transmission timing.

FIG. 2H shows the input timing to the reception antenna 29. The input is started at time t23 and is terminated at time t33. FIG. 2I shows the output timing from the reception MIX 32. The output is started at time t24 and is terminated at time t34. FIG. 2J shows the output timing from the detection section 34. The output is started at time t25 and is terminated at time t35. FIG. 2K shows the output timing from the comparator 35. The output is started at time t26 and is terminated at time t36. The reception determination section 36 determines time t26 to be the reception timing. The timings shown in FIGS. 2H to 2K are equal to those shown in FIGS. 6D to 6F.

FIG. 2L shows that a difference between time t43 in FIG. 2G and time t26 in FIG. 2K is the difference between the transmission timing and the reception timing. Generally, if high-speed electronic parts are used, the temperature power-supply fluctuation amount becomes small; if low-speed electronic parts are used, the temperature power-supply fluctuation amount becomes large. Since a reception signal processing system 100 has the same configuration as the auxiliary signal processing system 50, fluctuation of the delay amount caused in the low-speed operation circuit using low-speed electronic parts and fluctuation of the delay amount caused the high-speed operation circuit using high-speed electronic parts also occur in the both systems equally. Therefore, the difference between the transmission timing and the reception timing is almost equal to the difference between the transmission start time t22 from the transmission antenna 22 and the input start timing t23 to the reception antenna 29.

The radar 20 transmits the transmission signal generated in the transmission section 23 to the space as a search wave through the antenna 22. When the target 21 exists in the space, the reception signal processing system 100 receives the reflected wave and conducts a search process for the target 21. In the reception signal processing system 100, the reception section 30 is formed of the high-speed operation parts and the detection section 34 and the comparator 35 are formed of the low-speed operation parts. In the auxiliary signal processing system 50, the auxiliary reception section 40 has the same configuration as the reception section 30, and the detection section 44 and the comparator 45 have the same configuration as the detection section 34 and the comparator 35, respectively. The branching filter 37 branches the transmission signal to be emitted through the antenna 22 and inputs the branched transmission signal to the auxiliary reception section 40 directly. That is, the auxiliary signal processing system 50 processes the input transmission signal in a similar manner to the reception signal processing system 100. The fluctuation of the delay amount due to the effect of the temperature fluctuation or the power source fluctuation is affected on the transmission signal input to the auxiliary signal processing system 50 similarly to the reception signal processing system 100. Therefore, the fluctuation of the delay amount is not affected on the calculation of the difference between the transmission timing and the reception timing greatly. As a result, a calculation accuracy of the distance to the target 21 can be improved. That is, since the auxiliary signal processing system 50 has the same configuration as the reception signal processing system 100, the fluctuation amount caused in the reception signal processing system 100 can be cancelled and we can obtain the accurate distance, which is not affected by the fluctuation.

Figure 3:
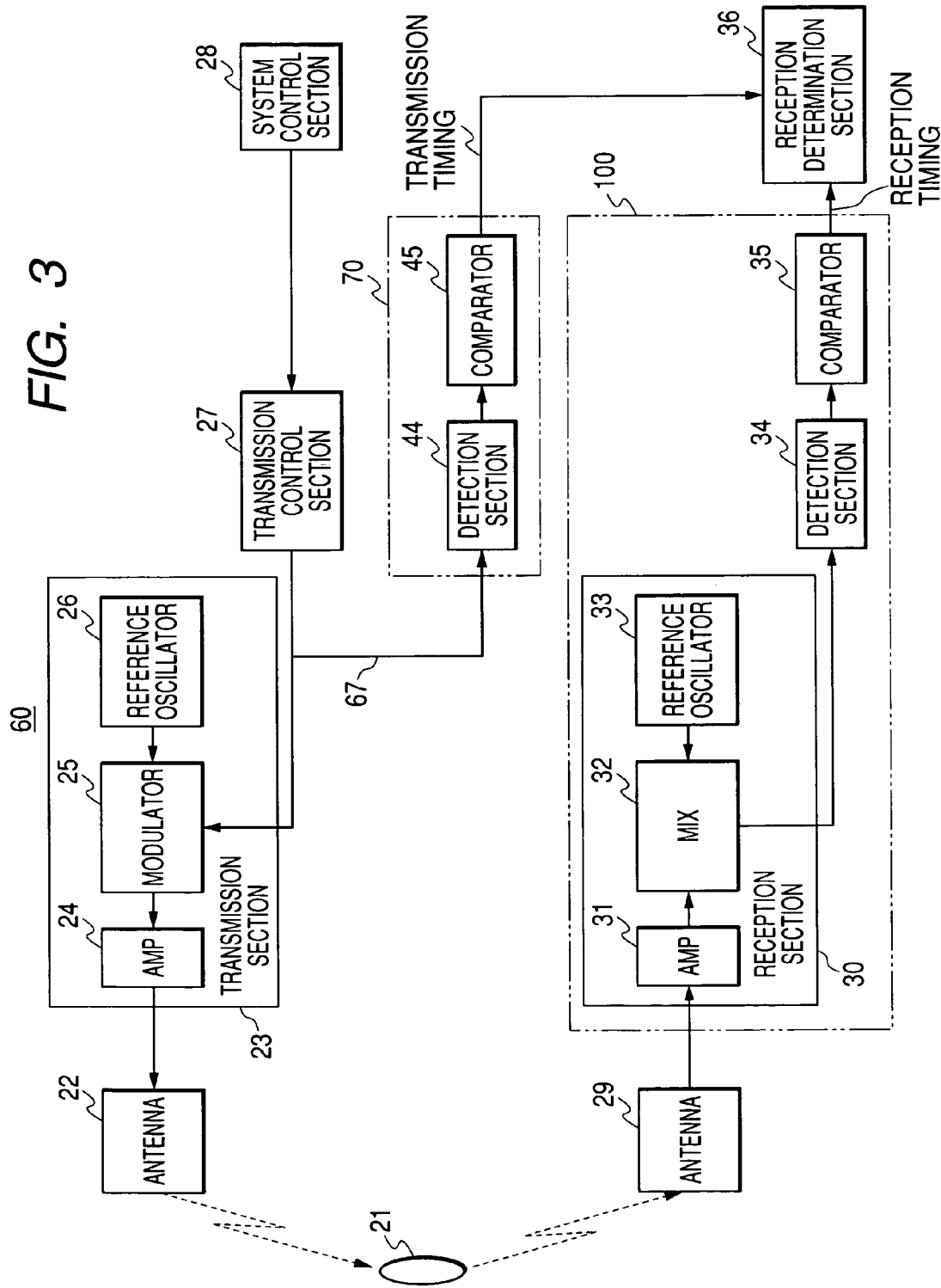
FIG. 3 is a block diagram to show the schematic electric configuration of a radar 60 according to a second embodiment of the invention.

FIG. 3 shows the schematic electric configuration of a radar 60 according to a second embodiment of the invention. Parts identical with those previously described with reference to FIG. 1 in the first embodiment are denoted by the same reference numerals in FIG. 3 and will not be discussed again. The auxiliary reception section 40 and the branching filter 37 in FIG. 1 need to process high frequency signals in a millimeter band, etc., and are expensive and therefore are not used in the radar 60 of the embodiment. In the radar 60, a modulation signal from a transmission control section 27 is input to a detection section 44 forming a part of an auxiliary signal processing system 70 through a branch line 67 as well as to a modulator 25. The auxiliary signal processing system 70 also includes a comparator 45. The auxiliary signal processing system 70 is made up of only low-speed operation circuits.

Figure 4A:
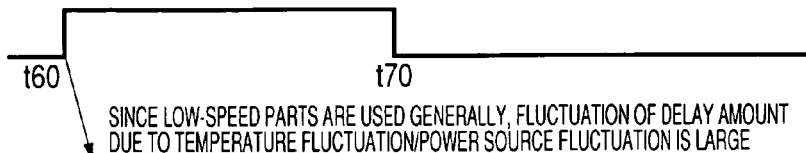
FIGS. 4A to 4J are time charts to show the degree of the effect of temperature fluctuation or power supply fluctuation in a case of operating the radar 60 in FIG. 3 in pulse mode.
Figure 4B:
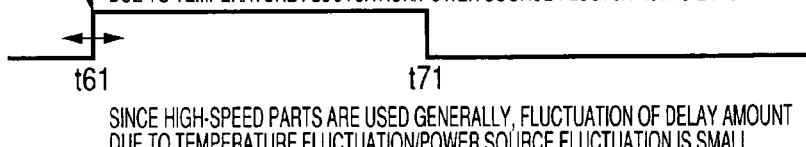
Figure 4C:
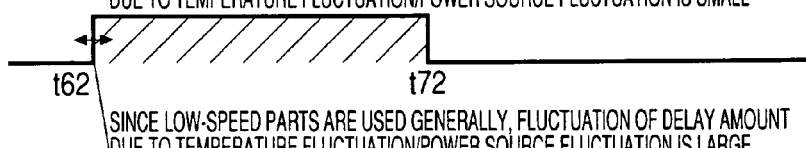

FIGS. 4A to 4J show the degree of the effect of temperature fluctuation or the power supply fluctuation in a case of operating the radar 60 shown in FIG. 3 in a pulse mode. FIG. 4A shows the transmission timing of a system control section 28. For example, the transmission timing is set so that pulse transmission is started at time t60 and is terminated at time t70. FIG. 4B shows the generation timing of a transmission modulation signal generated from the transmission control section 27. This timing is also the timing at which the modulation signal is output from the branch line 67 to the auxiliary signal processing system 70. The generation of the signal is started at time t61 and is terminated at time t71. FIG. 4C shows the output timing of a transmission antenna 22. The output is started at time t62 and is stopped at time t72.

Figure 4D:
Figure 4E:
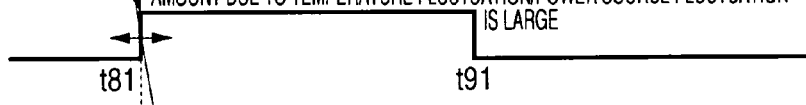

FIG. 4D shows the output timing from the detection section 44 of the auxiliary signal processing system 70. The output is started at time t80 and is terminated at time t90. FIG. 4E shows the output timing from the comparator 45. The output is started at time t81 and is terminated at time t91. A reception determination section 36 determines time t81 to be the transmission timing.

Figure 4F:
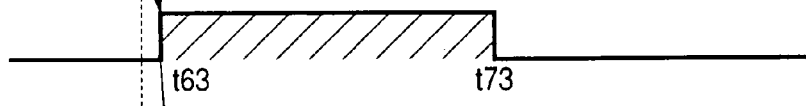
Figure 4G:
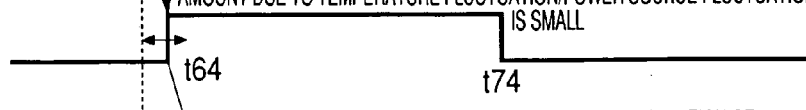
Figure 4H:
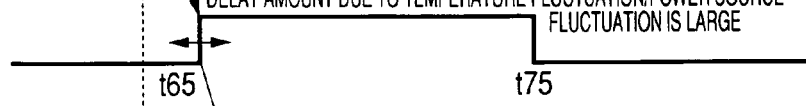
Figure 4I:
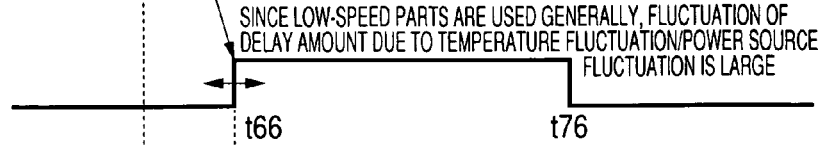
Figure 4J:
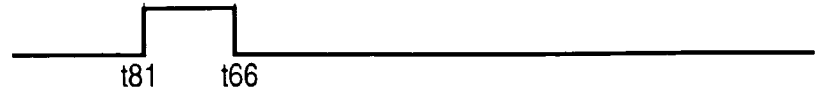

FIG. 4F shows the input timing to a reception antenna 29. The input is started at time t63 and is terminated at time t73. FIG. 4G shows the output timing from a reception MIX 32. The output is started at time t64 and is terminated at time t74. FIG. 4H shows the output timing from the detection section 34. The output is started at time t65 and is terminated at time t75. FIG. 4I shows the output timing from a comparator 35. The output is started at time t66 and is terminated at time t76. The reception determination section 36 determines time t66 to be the reception timing. The timings shown in FIGS. 4F to 4I are equal to those in FIGS. 6D to 6G.

In the radar 60 of this embodiment, a reception signal processing system 100 includes the reception section 30 formed of the high-speed operation parts, and the detection section 34 and the comparator 35, which are formed of the low-speed operation parts. The auxiliary signal processing system 70 includes the detection section 44 and the comparator 45, which have the same configuration as the detection section 34 and the comparator 35, respectively. The branch line 67 inputs the modulation signal to the auxiliary signal processing system 70 directly. Therefore, the auxiliary signal processing system 70 processes the input modulation signal in a similar manner to the detection section 34 and the comparator 35 in the reception signal processing system 100. In the reception signal processing system 100, the detection section 34 and the comparator 35, which involves larger delay amount than the reception section 30, causes larger fluctuation of the delay amount due to the effect of the temperature fluctuation or the power source fluctuation than the reception section 30. In this embodiment, the auxiliary signal processing section 70 can cancel the fluctuation of the delay amount. Therefore, the fluctuation of the delay amount is not affected on the calculation of the difference between the transmission timing and the reception timing greatly. As a result, a calculation accuracy of the distance to the target 21 can be improved. Generally, the high-speed operation parts are more expensive than the low-speed operation parts. According to the second embodiment, the auxiliary signal processing system 70 is not necessary to include a section having the same configuration as the reception section 30 formed of the high-speed operation parts. Therefore, the effect of the fluctuation can be reduced at low cost.

In each of the embodiments described above, if a plurality of identical circuits formed on the same semiconductor integrated circuit board are used for at least a part of the corresponding portion in the same configuration of the reception signal processing system and the auxiliary signal processing means 50, 70, it is easy to provide the same circuit configuration. The effect of the temperature, etc., is received equally. The fluctuation of the delay amount can also be made equal. The fluctuation of the delay amount is canceled, whereby search determination can be made with good accuracy.

In the radar search, the distance to the target is measured based on the transmission and reception timings. Thus, as the radar search mode, the invention can be applied not only to the pulse mode, but also to other modes, such as UWB (Ultra Wide Band) mode (radar mode in an ultra wide band by spread spectrum).

In the embodiments of the invention, the reception signal processing system 100 and the auxiliary signal processing system 50, 70 can cause equivalent delay amount in the signal processing and equivalent fluctuation of the delay amount due to the effect of the temperature fluctuation or the power source fluctuation, so long as the auxiliary signal processing system 50, 70 has the same configuration as at least a part of the reception signal processing system 100, which has an operation speed lower than the predetermined frequency. In the first embodiment, the branch filter 37 inputs the transmission signal generated in the transmission section 23 to the auxiliary signal processing system 50 directly. Therefore, the auxiliary signal processing system 50 is required to process only the transmission signal, and the reception signal processing system 100 is required to process only the reception signal. Accordingly, the difference between the timing when the transmission signal is transmitted and the timing when the reception signal is received can be determined accurately. The part of the reception signal processing system 100, which has an operation speed lower than the predetermined frequency, tends to fluctuate the delay amount under the influence of the temperature fluctuation or the power source fluctuation. However, the auxiliary signal processing system 50 also causes the equivalent fluctuation of the delay amount. Therefore, in the determination process on the target search performed by the search determination section 36, the large fluctuation of the delay amount caused in the reception signal processing system 100 cancels that in the auxiliary signal processing system 50 each other. As a result, even if the delay amount caused by parts used in the signal processing fluctuates due to the temperature fluctuation or the power source fluctuate, the accuracy can be maintained easily.

In other words, a signal indicating the transmission timing is passed through processings and path having similar delay amount and delay-amount fluctuation characteristic to processings for generating the reception timing from the received reflected wave. Thereby, the difference between the transmission timing and the reception timing approximately depends on only transmission delay time of the search wave in the space. Therefore, it can be suppressed greatly that the distance to the target is erroneously determined to be longer or shorter than the actual distance.

In the first embodiment, the auxiliary signal processing system 50 includes the auxiliary reception section 40 having the same configuration as the reception section 30; the detection section 44 and the comparator 45, which have the same configuration as the detection section 34 and the comparator 35, respectively. Therefore, the auxiliary signal processing system 50 can process the input transmission signal in a similar manner to the reception signal processing system 100. The reception signal processing system 100 and the auxiliary signal processing system 50 cause equivalent delay amount in the signal processing and equivalent fluctuation of the delay amount due to the effect of the temperature fluctuation or the power source fluctuation. As a result, since the fluctuation of the delay amount due to the effect of the temperature fluctuation or the power source fluctuation is not affected on calculation of the difference between the transmission timing and the reception timing greatly, calculation accuracy of a distance to the target can be enhanced.

In the second embodiment, the auxiliary signal processing system 70 includes the detection section 44 and the comparator 45 having the same configuration as the detection section 34 and the comparator 35, which are formed of the low-speed operation parts causing larger delay amount. Therefore, the auxiliary signal processing system 70 can process the input modulation signal in a similar manner to the detection section 34 and the comparator 35 of the reception signal processing system 100. The detection section 44 and the comparator 45 of the auxiliary signal processing system 70 can cancel the fluctuation of the delay amount caused in the detection section 34 and the comparator 35, which causes larger fluctuation of the delay amount due to the temperature fluctuation or the power source fluctuation. Therefore, the fluctuation of the delay amount is not affected on the calculation of the difference between the transmission timing and the reception timing greatly. As a result, the calculation accuracy of the distance to the target can be enhanced. Generally, the high-speed operation parts are more expensive than the low-speed operation parts. The auxiliary signal processing system 70 is not necessary to include a circuit having the same configuration as the reception section 30 of the reception signal processing system 100, which is formed of the high-speed operation parts. Therefore, the effect of the fluctuation can be reduced at low cost. In order to cancel the fluctuation of the delay amount due to the temperature fluctuation or the power source fluctuation without increasing cost highly, with regard to the low-speed operation parts occupying considerable weight of the fluctuation of the delay amount due to the temperature fluctuation or the power source fluctuation, a signal is passed through processings and path having similar delay amount and delay-amount fluctuation characteristic to processings for generating the reception timing from the received reflected wave. Thereby, the difference between the transmission timing and the reception timing is approximately equivalent to transmission delay time of the search wave in the space and small fluctuation of the delay time caused in the high-speed operation parts. Therefore, it can be suppressed greatly that the distance to the target is erroneously determined to be longer or shorter than the actual distance.

According to the embodiments of the invention, a plurality of identical circuits formed on the same semiconductor integrated circuit board are used, so that it is easy to provide the same configuration. The effect of the temperature or the like is influenced on the circuits on the single semiconductor integrated circuit board equally, and the fluctuation of the delay amount caused in the circuits on the single semiconductor integrated circuit board can also be made equal. Since the fluctuation of the delay amount caused in one circuit and that caused in another circuit can cancel each other, search determination can be made with good accuracy.

What is claimed is:

1. A radar for searching for a target, comprising:
   a transmission signal processing system which generates and transmits a transmission signal to space as a search wave;
   a reception signal processing system which receives a reflected wave at the target when the target exists and processes the received reflected wave, wherein the reception signal processing system includes:
      a high-speed operation circuit formed of a high-speed operation part, which operates at a higher frequency than a predetermined frequency; and
      a low-speed operation circuit formed of a low-speed operation part, which operates at lower speed than the predetermined frequency and processes the reflected wave;
   an auxiliary signal processing system which is separate from the reception signal processing system and has the same configuration as at least a part of the reception signal processing system, which has an operation speed lower then the predetermined frequency, wherein
      the auxiliary signal processing system includes an auxiliary low-speed operation circuit having the same configuration as the low-speed operation circuit;
   a transmission-signal input unit which directly inputs the transmission signal generated in the transmission signal processing system to the auxiliary signal processing system;
   a search determination unit which makes a determination on the search for the target on the basis of a processing result of the received reflected wave by the reception signal processing system and a processing result of the directly input signal by the auxiliary signal processing system; and
   the reflected wave to be processed by the low-speed operation circuit of the reception signal processing system is derived from the transmission signal, which the transmission-signal input unit inputs directly to the auxiliary low-speed operation circuit of the auxiliary signal processing system.

2. The radar according to claim 1, wherein:
   the search determination unit obtains a difference between a timing at which the transmission signal is transmitted and a timing at which the reflected wave is received on the basis of the processing result of the received reflected wave by the reception signal processing system and the processing result of the transmission signal by the auxiliary signal processing system.

3. The radar according to claim 1, wherein
   the auxiliary signal processing system further includes:
      an auxiliary high-speed operation circuit having the same configuration as the high-speed operation circuit.

4. The radar according to claim 1, wherein:
   the transmission signal processing system includes:
   a transmission control section which generates a modulation signal;
   a modulator which modulates a reference frequency on the basis of the modulation signal; and
   an amplifier which amplifies the modulated signal;
   the amplified signal is the transmission signal; and
   the signal, which the transmission-signal input unit inputs to the auxiliary low-speed operation circuit of the auxiliary signal processing system directly, is the modulation signal.

5. The radar according to claim 1, wherein the at least part of the reception signal processing system and the corresponding part of the auxiliary signal processing system include circuits, which are identical to each other and are formed on a single semiconductor integrated circuit board.

6. The radar according to claim 3, wherein:
   the high-speed operation circuit and the auxiliary high-speed operation circuit are formed on a single semiconductor integrated circuit board; and
   the low-speed operation circuit and the auxiliary low-speed operation circuit are formed on a single semiconductor integrated circuit board.

7. The radar according to claim 1, wherein:
   the low-speed operation circuit and the auxiliary low-speed operation circuit are formed on a single semiconductor integrated circuit board.

* * * * *